United States Patent [19]  [11] 4,011,620
Southgate  [45] Mar. 15, 1977

[54] PIPELINE TOOL FOR LAUNCHING TWO PIPELINE CLEARING SPHERES

[75] Inventor: Donald Alan Southgate, London, England

[73] Assignee: The British Petroleum Company Limited, London, England

[22] Filed: Apr. 1, 1975

[21] Appl. No.: 564,130

[30] Foreign Application Priority Data
Apr. 10, 1974 United Kingdom ............ 15915/74

[52] U.S. Cl. ........................ 15/104.06 A; 61/112; 134/8; 138/93
[51] Int. Cl.² ........................................ B08B 9/04
[58] Field of Search ............ 134/8, 22 C, 24; 15/104.06 A, 104.06 R, 3.5; 61/72.3, 112; 137/15; 138/93

[56] References Cited
UNITED STATES PATENTS

| 3,100,308 | 8/1963 | De Sena ................... 15/104.06 A |
| 3,469,408 | 9/1969 | Bloemhard ............ 15/104.06 A X |
| 3,751,932 | 8/1973 | Matthews, Jr. ................ 61/72.3 X |
| 3,961,493 | 6/1976 | Noland, Jr. et al. .... 15/104.06 A X |

Primary Examiner—Robert L. Lindsay, Jr.
Assistant Examiner—Richard V. Fisher
Attorney, Agent, or Firm—Morgan, Finnegan, Pine, Foley & Lee

[57] ABSTRACT

Pipeline tool for closing an open end of a pipeline and which is suitable for use with a pipeline sphere for clearing a pipeline has a tubular member for holding two spheres side by side and pipes for supplying compressed air to launch the spheres individually.

2 Claims, 1 Drawing Figure

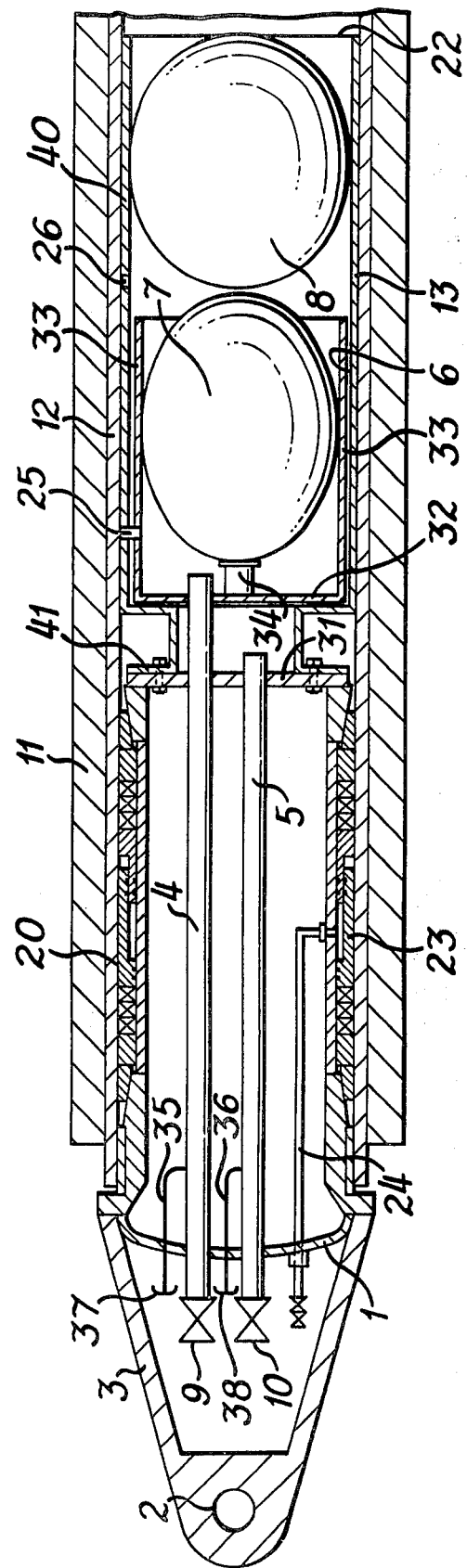

PIPELINE TOOL FOR LAUNCHING TWO PIPELINE CLEARING SPHERES

This invention relates to a pipeline tool suitable for closing an open end of a pipeline and which is suitable for use with one or two pipeline clearing spheres for clearing a pipeline. The invention also relates to a method for closing an open end of a pipeline, particularly an underwater pipeline and removing any oil or water from the pipeline. Sometimes it is necessary, for example to carry out repair work, to raise an underwater pipeline to the surface. If the pipeline has flooded, the presence of water in the pipeline makes it extremely heavy and, very difficult to raise. It is necessary, therefore, to remove the water from at least that part of the pipeline which is to be raised from the water bottom.

A tool for closing an open end of a pipeline is described in our copending UK Patent Application No. 4885/72, now U.K. Pat. No. 1,421,134, which corresponds to U.S. patent application Ser. No. 326,299, filed Jan. 22, 1973 and now abandoned, comprising a tubular member having an open end and a transverse closure. The open end is suitable for insertion in the open end of a pipeline and the tubular member has an outwardly radially expansible gripping and sealing means for gripping the inside of the pipeline and sealing thereagainst. The tool can be used to install a pipeline clearing sphere inside a pipeline and also move the sphere along inside the pipeline by a compressed gas and thereby clear the pipeline. At the commencement of the pipeline clearing operation the pipeline sphere is sucked into the interior of the tubular member by evacuating the latter. The tool is then inserted in the open end of the pipeline and the sphere displaced into the pipeline by a compressed gas.

Occasionally the passage of one pipeline sphere may not clear the pipeline to the desired extent and a need, therefore, exists for a tool for containing more than one pipeline clearing sphere having means for launching the spheres individually.

According to the present invention a pipeline tool for closing an open end of a pipeline and which is suitable for use with a pipeline clearing sphere for clearing a pipeline comprises in combination:
  i. a tubular member for holding two pipeline clearing spheres and having an open end for inserting in the open end of a pipeline and a transverse closure,
  ii. an outwardly radially expansible gripping and sealing means associated with the tubular member and actuatable by a fluid under pressure to grip the inside of a pipeline and seal thereagainst,
  iii. means for supplying the said fluid and
  iv. means for introducing compressed gas into the interior of the tubular member to displace the spheres individually from the interior of the tubular member into the interior of a pipeline.

Preferably the pipeline tool has means for introducing compressed gas into the interior of the tubular member at two spaced apart locations.

Preferably the means for introducing compressed gas to the interior of the tubular member at two spaced apart locations has means for introducing compressed gas into the space defined by the walls of the tubular member and the spheres (when present) whereby the sphere nearer the open end can be displaced individually and means for supplying compressed gas to the space defined by the transverse closure, the walls of the tubular member and the sphere nearer the transverse closure (when present) whereby the sphere nearer the transverse closure can be displaced.

The gripping and sealing means is preferably releaseable.

Preferably the gripping and sealing means is arranged around the outside of the tubular member.

Preferably the tubular member has a further tubular member (hereafter referred to as the inner tubular member) of smaller diameter disposed within the first mentioned tubular member, the inner tubular member also having a transverse closure and an open end.

Preferably the inner tubular member is coaxial with the first and has a diameter from 0.7 to 0.98 that of the first more preferably 0.90 to 0.96.

Preferably the means for introducing compressed gas to the interior of the tubular member comprises a pipe leading to the interior of the inner tubular member for admitting compressed gas to the space defined by the transverse closure of the inner tubular member, the walls of the inner tubular element and a pipeline sphere (when present) to displace the sphere held in the inner tubular member.

The location at which compressed gas is introduced into the interior of the tubular member are preferably up to one diameter from the transverse closure of the inner tubular member and from ¾ to 1½ diameters from the transverse closure of the inner tubular member. The diameter referred to being that of the inner tubular member.

Preferably means are provided for preventing contact of the sphere held in the inner tubular member (when in place) with the end of the pipe e.g. a rest member in the form of a projection having a flat end on the transverse closure of the inner tubular member.

Preferably a pipe for supplying compressed air leads to and ends in the space defined by the transverse closure and the side walls of the tubular member and the transverse closure of the inner tubular member. Preferably this space communicates with the space between the two pipeline spheres when in place, so that compressed air discharged from the pipe passes into the space between the two pipeline spheres.

Preferably the tool has means for evacuating the interior of the tubular member.

The pipeline tool can be used for clearing a portion of a submerged pipeline so that it can be raised to the surface.

Thus, according to another aspect of the invention a method of clearing a portion of a submerged pipeline comprises:
  i. inserting in the open end of the pipeline, a pipeline tool (as hereinbefore described) containing two pipeline clearing spheres
  ii. actuating the gripping and sealing means to grip the inside of the pipeline and seal thereagainst
  iii. supplying compressed gas to displace the sphere which is nearer the open end of the tubular member into the pipeline and along the inside thereof, and then
  iv. supplying compressed gas to displace the pipeline sphere nearer the transverse closure into the pipeline and along the inside thereof to thereby clear the pipeline.

The invention is illustrated by reference to the drawing which shows the pipeline tool in longitudinal section.

The tool indicated generally by 20 has a tubular member 13 having transverse closure in the form of a transverse wall 31 and an open end 22 which is to be inserted in the open end of a pipeline 12. The tool is shown holding two pipeline spheres 7 and 8 which are normally the same size and have a diameter slightly greater than that of the pipeline 12 so that they are an interference fit therein but moveable therealong. The tubular member 13 has an outwardly radially expansible gripping and sealing means (which is releaseable) indicated generally by 23 and an inlet pipe 24 for the admission of hydraulic fluid to actuate the gripping and sealing means 23. The tubular member 13 has an inner tubular member 33 of smaller diameter disposed therein and also has closeable apertures 25 and 26 whereby air or gas trapped in the member by spheres 7 and 8 can be released. This aspect of the pipeline tool is the subject of my commonly assigned, copending application Ser. No. 564,129, filed Apr. 1, 1975.

Means for introducing compressed air to the interior of the tubular member to displace spheres 7 and 8 individually comprises pipes 4 an 5 provided with valves 9 and 10 respectively which pipes extend from the exterior of the tubular member and are provided with vacuum connection lines 35 and 36 and caps 37 and 38 for sealing after use. Pipe 5 terminates in the space between transverse walls 31 and 32 and the walls of the tubular member and pipe 4 extends further and ends in the space defined by wall 32 and walls 33 of the inner tubular member. The pipe 4 extends about 3 inches beyond wall 32. To prevent contact between a sphere and the end of the pipe 4 a rest member 34 is provided on wall 32. The rest member projects about 4 inches out from wall 32.

At the end remote from the open end 22 there is provided a support plate 1 for pipes 4, 5, 24, 35 and 36 and also a conically tapering member 3 which protects valves 9 and 10 from damage during operations and has its apex an anchoring point 2 (which is on the longitudinal axis of the tubular member) for the attachment of a chain or cable (not shown).

A portion 40 of the tool is attached to the transverse wall 31 by means of a bolted flange 41. The inner tubular member 33 is positioned concentrically within portion 40 on longitudinal stringers (not shown).

In use in a submerged pipeline clearing operation the spheres 7 and 8 are sucked into the tubular member 13 by evacuating the member by means of pipes 35 and 36 with valves 9 and 10 closed and then water is pumped into the member via pipes 4 and 5 and 35 and 36 and air is expelled through closeable apertures 25 and 26. Caps 37 and 38 are then screwed on to seal pipes 35 and 36 and plugs screwed into apertures 25 and 26. The tubular member 13 is lowered through the water and is inserted in the open end of the submerged pipeline 12 which has a concrete weight coating 11 and the gripping and sealing means 23 actuated by pumping in fluid via line 24 to grip and seal the inside of the pipeline 12. Valve 10 is then opened and compressed air admitted via pipe 5 through the annular space 6 between tubular member 13 and the inner tubular member 33 to launch sphere 8. When it is desired to launch sphere 7 valve 9 is opened and compressed air is admitted from pipe 4.

I claim:

1. A pipeline apparatus suitable for closing an open end of a pipeline and for carrying and individually launching two pipeline clearing spheres for clearing a pipeline comprising:
    i. a first tubular member having a given diameter for longitudinally holding said pipeline spheres therein and having an open end for insertion into the open end of a pipeline and a closure opposite said open end;
    ii. a second tubular member having a diameter from 0.7 to 0.98 that of said given diameter and positioned in said first tubular member for holding one of said spheres nearer the closure of said first tubular member, said second tubular member having a transverse closure and an open end;
    iii. an outwardly radially expansible gripping and sealing means associated with said first tubular member and actuatable by a fluid under pressure to grip the inside of a pipeline and seal thereagainst;
    iv. means for supplying said fluid to actuate said gripping and sealing means; and
    v. means for introducing compressed gas into the interior of said first and second tubular members at two longitudinally spaced apart locations to displace the spheres individually from the interior of the tubular members into the interior of a pipeline, the gas introduction location for said first tubular member being up to one given diameter from the first transverse closure and from ¾ to 1½ given diameters from the transverse closure of said second tubular member.

2. A pipeline apparatus as claimed in claim 1 wherein means are provided for preventing contact between the sphere held in said second tubular member and the means for introducing compressed gas to the interior of said second tubular member.

* * * * *